(12) United States Patent
MacDermot

(10) Patent No.: US 12,002,166 B2
(45) Date of Patent: Jun. 4, 2024

(54) METHOD AND DEVICE FOR COMMUNICATING A SOUNDSCAPE IN AN ENVIRONMENT

(71) Applicant: Inter IKEA Systems B.V., Delft (NL)

(72) Inventor: Samuel MacDermot, Salford (GB)

(73) Assignee: INTER IKEA SYSTEMS B.V., Delft (NL)

( * ) Notice: Subject to any disclaimer, the term of this patent is extended or adjusted under 35 U.S.C. 154(b) by 175 days.

(21) Appl. No.: 17/516,059

(22) Filed: Nov. 1, 2021

(65) Prior Publication Data

US 2022/0139048 A1    May 5, 2022

(30) Foreign Application Priority Data

Nov. 2, 2020  (EP) .................................... 20205126

(51) Int. Cl.
*G06T 19/00* (2011.01)
*H04R 3/00* (2006.01)
*H04S 7/00* (2006.01)

(52) U.S. Cl.
CPC ............ *G06T 19/006* (2013.01); *H04R 3/005* (2013.01); *H04S 7/30* (2013.01); *H04S 2400/15* (2013.01)

(58) Field of Classification Search
CPC .................................................... G06T 19/006
See application file for complete search history.

(56) References Cited

U.S. PATENT DOCUMENTS

| | | | | |
|---|---|---|---|---|
| 10,484,811 | B1* | 11/2019 | Mindlin | .................. H04S 7/303 |
| 2012/0093320 | A1* | 4/2012 | Flaks | ..................... H04S 7/304 |
| | | | | 381/17 |
| 2017/0193299 | A1 | 7/2017 | Cho et al. | |
| 2018/0374276 | A1 | 12/2018 | Powers et al. | |
| 2019/0188915 | A1 | 6/2019 | Meier et al. | |
| 2019/0259205 | A1 | 8/2019 | Nissinen et al. | |
| 2020/0162833 | A1* | 5/2020 | Lee | ......................... H04R 5/02 |
| 2021/0125702 | A1* | 4/2021 | Biggs | ..................... G16H 10/20 |
| 2021/0134071 | A1* | 5/2021 | Gustavsson | ............... G06T 7/70 |

FOREIGN PATENT DOCUMENTS

| | | |
|---|---|---|
| WO | 2013/155217 A1 | 10/2013 |
| WO | 2019/147699 A2 | 8/2019 |

OTHER PUBLICATIONS

"What is a Microphone Array?", Mar. 24, 2011, http://www.learningaboutelectronics.com/Articles/What-is-an-array-microphone (Year: 2011).*
Search Report for European Patent Application No. 20205126.4 (dated Apr. 7, 2021).
PCT International Search Report and Written Opinion for PCT/EP2021/080259 dated Feb. 7, 2022 (12 pages).

* cited by examiner

*Primary Examiner* — Michelle L Sams
(74) *Attorney, Agent, or Firm* — Nixon & Vanderhye, P.C.

(57) ABSTRACT

A method for rendering a soundscape in an environment in form of a real-world indoor scene is provided. The method comprises the steps of recording a present soundscape in the environment, identifying an empty area in the environment, selecting a virtual object to be placed at the empty area, rendering an updated soundscape in the environment using the present soundscape and sound-absorbing properties of the selected virtual object, playing the rendered updated soundscape, and displaying the selected virtual object placed at the empty area.

22 Claims, 5 Drawing Sheets

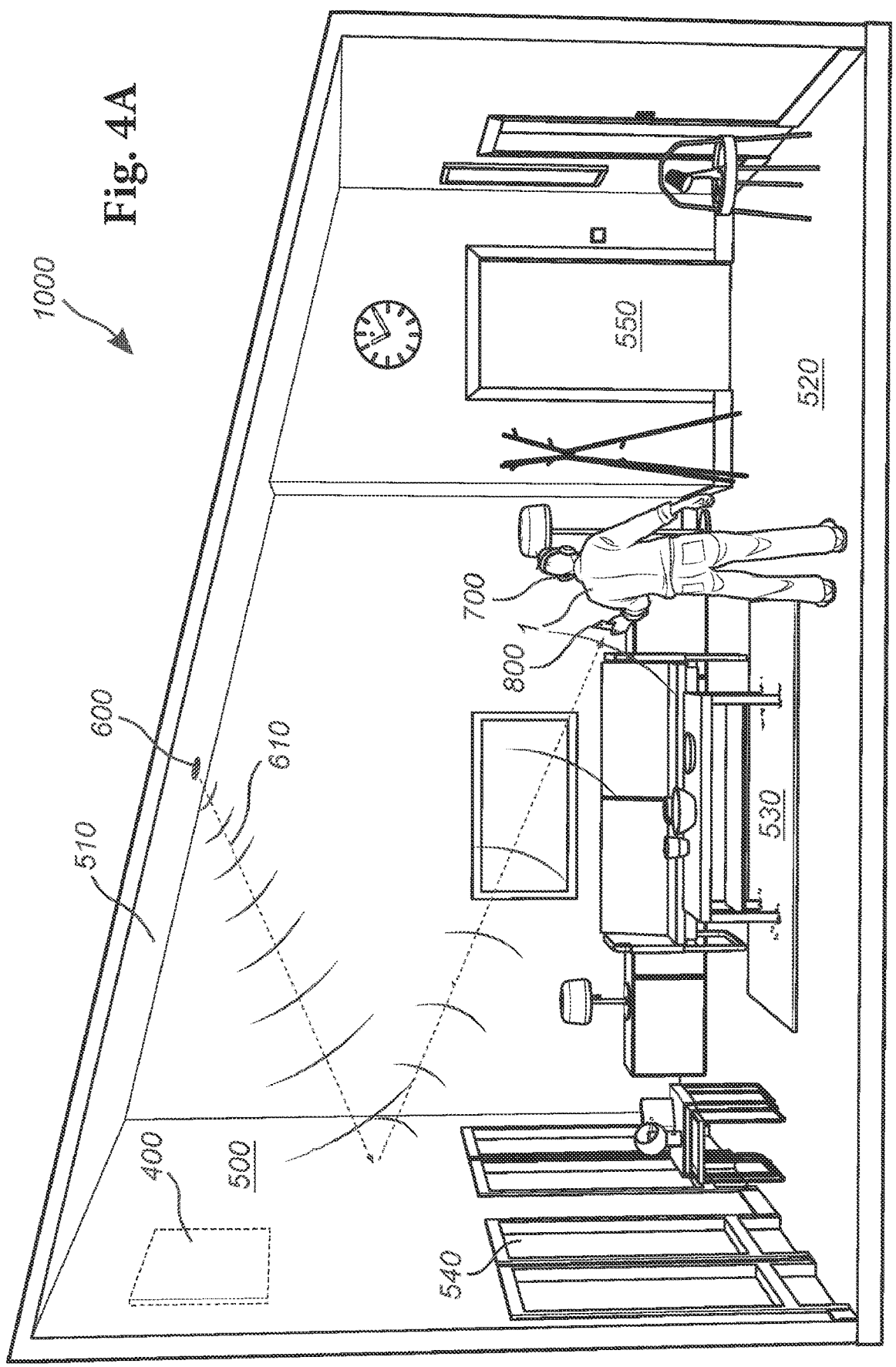

METHOD AND DEVICE FOR COMMUNICATING A SOUNDSCAPE IN AN ENVIRONMENT

CROSS REFERENCE TO RELATED APPLICATION(S)

This application claims benefit of Application No. 20205126.4, filed Nov. 2, 2020 in Europe and which application is hereby incorporated by reference in its entirety. To the extent appropriate, a claim of priority is made to the above disclosed application.

FIELD OF TECHNOLOGY

The present disclosure belongs to methods and devices for communicating a soundscape in an environment.

BACKGROUND

Applications for placing virtual objects in an environment using, e.g., a camera of a smartphone are common for commercial or private use. The smartphones of today are increasingly accurate in determining the spatial properties of an environment, such as a room of a home. Not only has the calculation capability of processors enabled computationally demanding object- or image-segmentation algorithms to enter the smartphone segment, but also 3D cameras, utilizing, e.g., lasers-based techniques, have started supplementing ordinary smartphone camera modules. The increasing accuracy in rendering 3D space in such applications may therefore allow a user to furnish a home by including a realistically rendered virtual object in a room. Hence, the user may see and evaluate an updated environment, including the virtual object, before actually buying and physically installing such an object in the room.

However, applications for placing virtual objects do not account for a change in a soundscape of the environment based on acoustical properties of the virtual object. Hence, there is a need for an approach for communicating a soundscape in an environment to supplement the visual rendering when including a virtual object in the environment.

SUMMARY

Thus, it is an object of the invention to provide a method for communicating a soundscape in an environment.

According to a first aspect of the invention, there is provided a method for rendering a soundscape in an environment in form of a real-world indoor scene, said method comprising the steps:
  recording a present soundscape in the environment,
  identifying an empty area in the environment,
  selecting a virtual object to be placed at the empty area,
  rendering an updated soundscape in the environment using the present soundscape and sound-absorbing properties of the selected virtual object,
  playing the rendered updated soundscape, and
  displaying the selected virtual object placed at the empty area.

The soundscape as referred to herein, is a real or an artificial acoustic environment as perceived by humans.

The recording of the present soundscape in the environment aims to mimic a soundscape of an actual space. Such an actual space may be a room in a home, or the like. The virtual object may be a photorealistic rendering of a real object to be placed in a home, e.g., a piece of furniture. The virtual object may also be an object mainly intended to be used as a sound-absorbing object, such as a sound-absorbing plate placed on a wall or the like. The virtual object may be a piece of furnishing, e.g. a curtain, a carpet, or the like, having sound-absorbing properties.

The method allows a user to not only visually experience an environment that includes a superimposed virtual object, but also acoustically experience the environment that includes such a superimposed virtual object. The user may then compare a soundscape between before and after the virtual object is included in the environment and evaluate the sound-absorbing properties of the virtual object. Such a virtual comparison may be an economical and environmentally friendly option of choosing and trying sound-absorbing objects for installation in a home, saving time and cost, as well as reducing environmental pollution by avoiding unnecessary shipping.

The method may further comprise:
  determining a size of the empty area, wherein selecting the virtual object is based on the size of the empty area.

This may save time for the user, and may reduce user-related errors, and the like. The user may manually select an empty area in the environment, wherein the size of such an empty area may be determined.

The method may further comprise:
  classifying a type of the empty area, wherein the type of the empty area comprises one or more of a floor, a wall, a ceiling, a window, and a door,
  determining a list of candidate virtual objects based on the type of the empty area,
  wherein the act of selecting a virtual object to be placed at the empty area is performed by selecting one of the candidate virtual objects in the list as the virtual object to be placed at the empty area.

The classification of the empty area may be performed using an image search algorithm. Within the present disclosure, an image search algorithm may be understood to be an algorithm for searching for images of objects in a database that are similar to an object of the image, and use the outcome to classify the object, i.e., searching for a label or a classification of a similar object from a set of similar images in a database. Examples of known commercial image search algorithms at the filing of this disclosure comprises Google images, Google Lens, TinEye and Alibabas Pailitao.

This allows a fast and convenient way of selecting among a list of virtual objects having sound-absorbing properties and being suitable for the type of empty area, e.g., selecting among curtains or blinds for a window. The user may manually select between the virtual objects, enabling flexibility regarding a soundscape preference of the user. The user may provide a subjective feedback for improving the image search algorithm should the user experience an inaccurate classification of the image search algorithm.

The updated soundscape may be rendered in real time. The updated soundscape may be rendered by recording and storing the present soundscape and thereafter rendering the updated soundscape by adjusting the stored present soundscape based on sound-absorbing properties of the selected virtual object.

Rendering the updated soundscape in real time allows the user to evaluate the updated soundscape as if the virtual object was actually placed in the environment. This offers an efficient evaluation of the updated soundscape. By enabling adjusting of the stored present soundscape enhances the flexibility of the method. For instance, this may enable tuning of the soundscape according to a soundscape preference of the user, causing updating of, e.g., the size of the virtual object.

The sound-absorbing properties may comprise the product of the level of sound-absorption per unit area of the virtual object and the area of the virtual object.

This allows an accurate and computationally efficient modeling of the sound-absorbing properties of the virtual object, e.g., when changing a size of the virtual object.

The recording of the present soundscape may comprise:
recording sound in the environment using an array of microphones, and
applying a 3D sound localization algorithm on the recorded sound.

By using an array of microphones enables localization of a source of sound in the environment. Preferably the recorded sound is captured using at least two microphones. The at least two microphones are preferably located in, or close to the ear canals of the user. The recorded sound may thereby accurately capture the impact of the sound by the head of the user, the shape of the ears of the user, and the like. The recorded sound may thus mimic the sound observed by the user for further enhancing a realistically rendered present soundscape.

The 3D sound localization algorithm enables determining the source of a sound in three-dimensional space. The 3D sound localization algorithm may be a binaural hearing model, enabling determining an angle of arriving sound by a time delay of the arriving sound between the microphones. Other 3D sound localization algorithms are equally plausible.

The identifying of the empty area in the environment may comprise applying an object segmentation algorithm on an image of the environment. Consequently, an empty area in the environment may efficiently be determined from an image of the environment using suitable 2D image analysis algorithms. This further reduces the required complexity of a device capturing the environment.

The method may comprise generating a 3D model of the environment, wherein the identifying of the empty area in the environment comprises applying an object segmentation algorithm on the 3D model of the environment.

The 3D model of the environment may be generated using a 360-degree camera by stitching or partially merging a series of images captured in a plurality of directions from the position of the user. Alternatively, the 3D model of the environment may be generated by a point cloud captured by a 3D scanner. The 3D scanner may be based on any 3D-scanning technology, e.g. utilizing a time-of-flight laser, a light detection and ranging (LIDAR) laser, a conoscopic-holography based method, a phase-shift based method, a triangulation-based method, or the like. The object segmentation algorithm may be applied on any of the type of 3D model, similarly as of described above. Using a 3D model of the environment for identifying the empty area may enhance accuracy for determining the size and the type of the empty area. For instance, present smartphone technologies utilize a combined image capturing by a camera and movement of the camera for determining distances, areas and the like. The scarcity of such measurements may be overcome by using, e.g., a 3D scanner to generate a 3D model of the environment. More complicated geometries of environments and objects, such as measuring distances of curved objects or spaces, may further be handled by such a 3D model. Any type of ground-truth capturing device may be used for generating the 3D model of the environment.

According to a second aspect of the invention, there is provided a non-transitory computer-readable storage medium having stored thereon program code portions for implementing the method according to the first aspect when executed on a device having processing capabilities.

The above-mentioned features of the method, when applicable, apply to this second aspect as well. In order to avoid undue repetition, reference is made to the above.

According to a third aspect of the invention, there is provided an electronic device comprising:
an array of microphones configured to record a present soundscape of an environment in form of a real-world indoor scene,
a device configured to capture a digital representation of a physical structure of the environment,
circuitry configured to execute:
a soundscape recording function configured to record a present soundscape of the environment by analyzing sound recorded by the array of microphones,
an empty-area identifying function configured to identify an empty area in the environment from the digital representation of the physical structure of the environment,
a virtual-object selecting function configured to select a virtual object to be placed at the empty area in the environment,
wherein the soundscape recording function is further configured to render an updated soundscape in the environment using the present soundscape and sound-absorbing properties of the selected virtual object,
the electronic device further comprises:
a speaker configured to play the updated soundscape,
a display configured to display the selected virtual object placed at the empty area.

The above-mentioned features of the method, when applicable, apply to this third aspect as well. In order to avoid undue repetition, reference is made to the above.

The circuitry may further be configured to execute:
a size-determining function configured to determine a size of the empty area, wherein the virtual-object selecting function is configured to select the virtual object based on the size of the empty area.

The circuitry may be further configured to execute:
a type-classifying function configured to classify a type of the empty area, wherein the type of the empty area comprises one or more of a floor, a wall, a ceiling, a window, and a door,
a candidate-virtual-object determining function configured to determine a list of candidate virtual objects based on the type of the empty area,
wherein the virtual-object selecting function is configured to select one of the candidate virtual objects in the list as the virtual object to be placed at the empty area.

The empty-area identifying function may be configured to identify the empty area in the environment by applying an object segmentation algorithm on the digital representation of the physical structure of the environment.

The circuitry may further be configured to execute a 3D-modeling function configured to generate a 3D-model of the environment, wherein the empty-area identifying function is configured to identify the empty area in the environment by applying an object segmentation algorithm on the 3D-model of the environment.

The electronic device may be implemented in an augmented reality, AR, device or a virtual reality, VR, device.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments, with reference to the appended drawings, where the same reference numerals will be used for similar elements, wherein:

FIGS. 4A and 4B schematically show an environment in which the electronic device comprising the implemented method may be applied.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
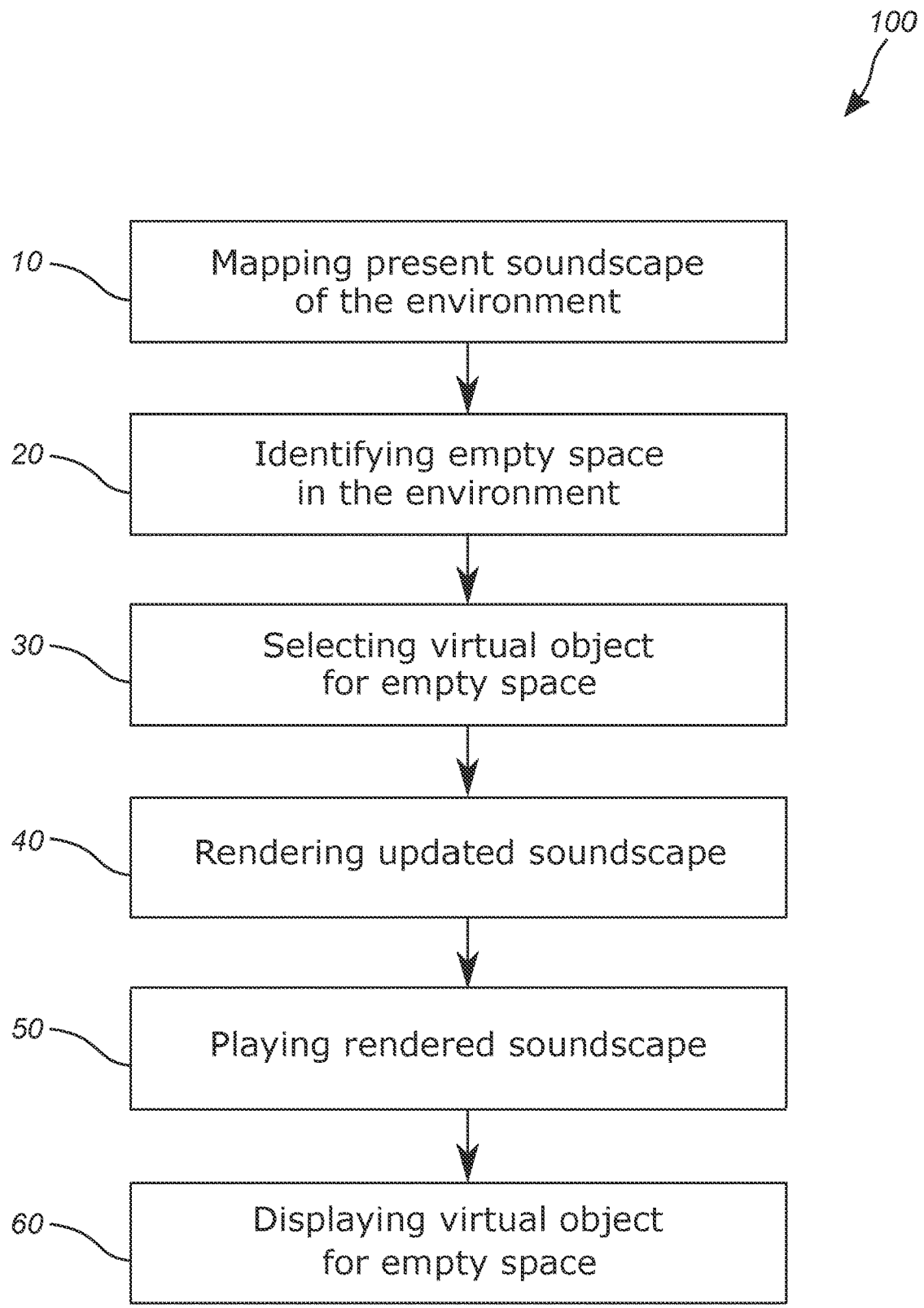
FIG. 1 schematically shows a flowchart of an example of the disclosed method.

FIG. 1 schematically shows a flowchart of a method 100 for rendering a soundscape in an environment. Although, the steps/acts of the method are disclosed in a specific order in connection with FIG. 1, it is to be understood that the steps/acts of the method may be performed in any suitable order.

The method 100 comprises recording 10 of a present soundscape in the environment 1000. The environment 1000 being an indoor scene, especially a real-world indoor scene, such as a room comprising walls 500, a ceiling 510 and a floor 520; see FIGS. 4A and 4B, which shows an example environment 1000 in which the electronic device 200 comprising the implemented method 100 may be applied. The environment 1000 may be a room in a home. The environment 1000 may be furnished. The recorded sound may originate from either or both of a source of sound 600 from inside the environment and a source of sound from outside the environment. In the event of the environment being an indoor scene, examples of sources of sound 600 from inside the environment may be sound from a ventilation system, a heat pump, a washing machine, or the like. In such a case, examples of sources of sound from outside the environment may be wind gusts, road traffic, and the like. Hence, at least parts of the sound may be considered as noise.

The present soundscape in the environment 1000 may be recorded using a type of a sensor structure. The present soundscape in the environment 1000 may be recorded using an array of microphones 210. The array of microphones 210 may comprise a plurality of microphones. The plurality microphones may be located in, or close to the ear canals of a user. An example of a suitable device comprising the array of microphones 210 is a set of headphones 700. Examples of a set of headphones 700 may be earbuds, earphones, and over-ear headphones. The microphones may be built into a pair of earphones wherein respective earphone comprises at least one microphone 210. The respective earphone may comprise a plurality of microphones 210. The user may wear the microphones 210 while recording and/or playing the sound of the environment 1000.

Alternatively, a binaural hearing robot head may be used for such a recording employing the above-mentioned array of microphones 210. Such a binaural hearing robot head may have similar acoustical properties as a human head and may thereby be able to realistically capture sound in the environment.

The recording 10 of the present soundscape may comprise applying a 3D sound localization algorithm on the recorded sound.

The 3D sound localization algorithm may be any one of a binaural hearing model, steered beamformer approach, a collocated microphone approach, a learning method for binaural hearing, a head-related transfer function, a cross-power spectrum phase analysis, a 2D sensor line array, and a hierarchical fuzzy artificial neural networks approach. Any type of spatial audio algorithm or spatial audio recording device is possible to use.

The 3D sound localization algorithm may advantageously be a binaural hearing model. The binaural hearing model determines an angle of arriving sound by a time delay of the arriving sound between the microphones. The microphones 210 may be arranged as described above, i.e., for instance in a pair of earphones.

The method 100 further comprises identifying 20 an empty area 400 in the environment 1000. The identifying 20 of the empty area 400 may comprise applying an object segmentation algorithm on a digital representation of a physical structure of the environment 1000. The digital representation of the physical structure of the environment 1000 may be an image displaying the environment 1000. The image may be a two-dimensional, 2D, image. Such a 2D image may be used alone as a base for applying the object segmentation algorithm. The image may be of a raster-graphics type or a vector-graphics type. The object segmentation algorithm may identify objects in the environment 1000 by using the image as an input and provide an output based on a list of identified objects. Objects may be segmented from the image using any object segmentation algorithm. Each object may be associated with a list of possible classifications of the object along with an accuracy of each possible classification. The object segmentation algorithm may identify an empty area 400 in the environment 1000, wherein the empty area 400 may be one or more of a floor 520, a wall 500, a ceiling 510, a window 540, a door 550, and the like. The empty area 400 may be any type of empty area in the environment where soundwaves may reflect against a substantially flat surface (as in the case of a wall/floor/ceiling) or enter the environment (as in the case of a window) and propagate towards a listener 1 of the soundscape of the environment 1000 without being substantially attenuated or damped by an object in the environment such as a furniture, carpet 530, curtain, etc. The wording "user" and "listener" may be interchangeably used below.

In one embodiment, the environment 1000 is a room comprising walls 500 which may or may not have windows and doors, a ceiling 510 and a floor 520, and the empty area 400 is an area of the wall 500, the ceiling 510 or the floor 520 where soundwaves may reflect against a substantially flat surface as in the case of a wall/floor/ceiling, or enter the environment 1000, as in the case of a window 540 or an open door 550, and propagate towards a listener 1 of the soundscape of the environment 1000 without being substantially attenuated or damped by an object of the environment 1000, such as a furniture, a carpet 530, a curtain, or the like.

The classification of the empty area 400 may be performed using an image search algorithm. The image search algorithm may be an algorithm for searching for images of objects in a database that are similar to an object of the image and use the outcome for classifying the object. That is, the image search algorithm may search for a label or a class of a similar object from a set of similar images in a database. Examples of known commercial image search algorithms at the filing of this disclosure comprises Google images, Google Lens, TinEye and Alibabas Pailitao.

The identifying 20 of the empty area 400 in the environment 1000 may comprise generating a 3D-model of the environment 1000 and applying an object segmentation algorithm on the 3D-model of the environment 1000. The 3D model may be generated using a 360-degree camera for stitching a series of images captured in a plurality of directions from the location of the user 1. Alternatively, the 3D model may be generated from a point cloud captured by a 3D scanner. The 3D scanner may be based on any known 3D-scanning technology, e.g. utilizing a time-of-flight laser, a light detection and ranging (LIDAR) laser, a conoscopic-holography based method, a phase-shift based method, a triangulation-based method, or the like. The object segmentation algorithm may be applied on any of the type of 3D models, similarly as of described above.

The identifying 20 of the empty area 400 may comprise determining a size of the empty area 400. The size of the empty area 400 may be calculated directly from a point cloud model of the environment 1000 by utilizing an object segmentation algorithm, the classification algorithm and the coordinates of the relevant points of the point cloud. If the environment 1000 and the empty area 400 is captured by an ordinary digital camera, distances, and thereby the size of the empty area 400, may be calculated by detecting a motion of the camera, using a built-in accelerometer, while capturing an image of the environment 1000 and the empty area 400. Examples of devices having both an ordinary digital camera and a built-in accelerometer is a smartphone 800, a tablet, an AR or VR device, or the like. The object segmentation algorithm and the classification algorithm may in such a situation be applied accordingly. An image captured by an ordinary digital camera may be either or both of a raster-graphics type and a vector-graphics type. Should the image be of raster-graphics type, the image may be converted to vector-graphics type by a built-in converter. Similarly, an opposite conversion may be applied. An image captured by an ordinary digital camera, i.e., typically a raster-graphical 2D image, may alternatively be supplemented by a three-dimensional, 3D, image, wherein the 3D image may be a point cloud. Other ways of determining the size of the empty area 400 comprise defining a 3D coordinate space of the environment 1000 from the image, by applying an algorithm to the image. It is to be noted that there are many algorithms that may be suitable for calculating a 3D coordinate space. By way of example, the 3D coordinate space may be calculated by applying a Plane detection algorithm, or a RANSAC algorithm, or a Hough algorithm, or the like, to the image. From the 3D coordinate space, positions and sizes of defined objects in the environment 1000 may be determined, and from that, a size of the empty area 400 may be calculated.

The method 100 comprises selecting 30 a virtual object 300 to be placed at the empty area 400. The selecting 30 of a virtual object 300 may be based on the size of the empty area 400. The size of the virtual object 300 may be selected such that the virtual object 300 fits within the size of the empty area 400. The volume of the empty area 400 may be equal to, or larger than the volume of the selected virtual object 300 to be placed in the empty area 400. The selected virtual object 300 may have sound-absorbing properties. Preferably, the selected virtual object 300 has noise-damping properties. The selected virtual object 300 may have any sound-changing property, such as properties for altering a reverberation or other acoustics in the environment 1000. The selected virtual object 300 may also have active noise cancelling properties, such as an active noise control device. As understood by the skilled reader, noise control is an active or passive means of reducing sound emissions, often for personal comfort, environmental considerations or legal compliance. An active noise control may allow a sound-level reduction using a power source. Such a sound-level reduction typically utilizes destructive interference on certain types of sounds, e.g., periodic or quasi-periodic noise. Passive noise control is sound reduction by noise-isolating materials such as insulation, furniture, cloth or other textiles, sound-absorbing tiles, or a muffler rather than a power source.

The selecting 30 of the virtual object 300 may comprise a classification of a type of the empty area 400, wherein the type of the empty area 400 comprises one or more of a floor 520, a wall 500, a ceiling 510, a window 540, and a door 550. The selecting 30 may further comprise determining a list of candidate virtual objects based on the type of the empty area 400. The act of selecting 30 a virtual object 300 to be placed at the empty area 400 may be performed by selecting one of the candidate virtual objects in the list as the virtual object 300 to be placed at the empty area 400.

The classification of the empty area 400, as described above, may form a base to determine the list of candidate virtual objects. For instance, if the empty area 400 is classified as a floor 520, one of the candidate virtual objects may be a carpet 530, or the like. Other examples are given below.

Figure 2:
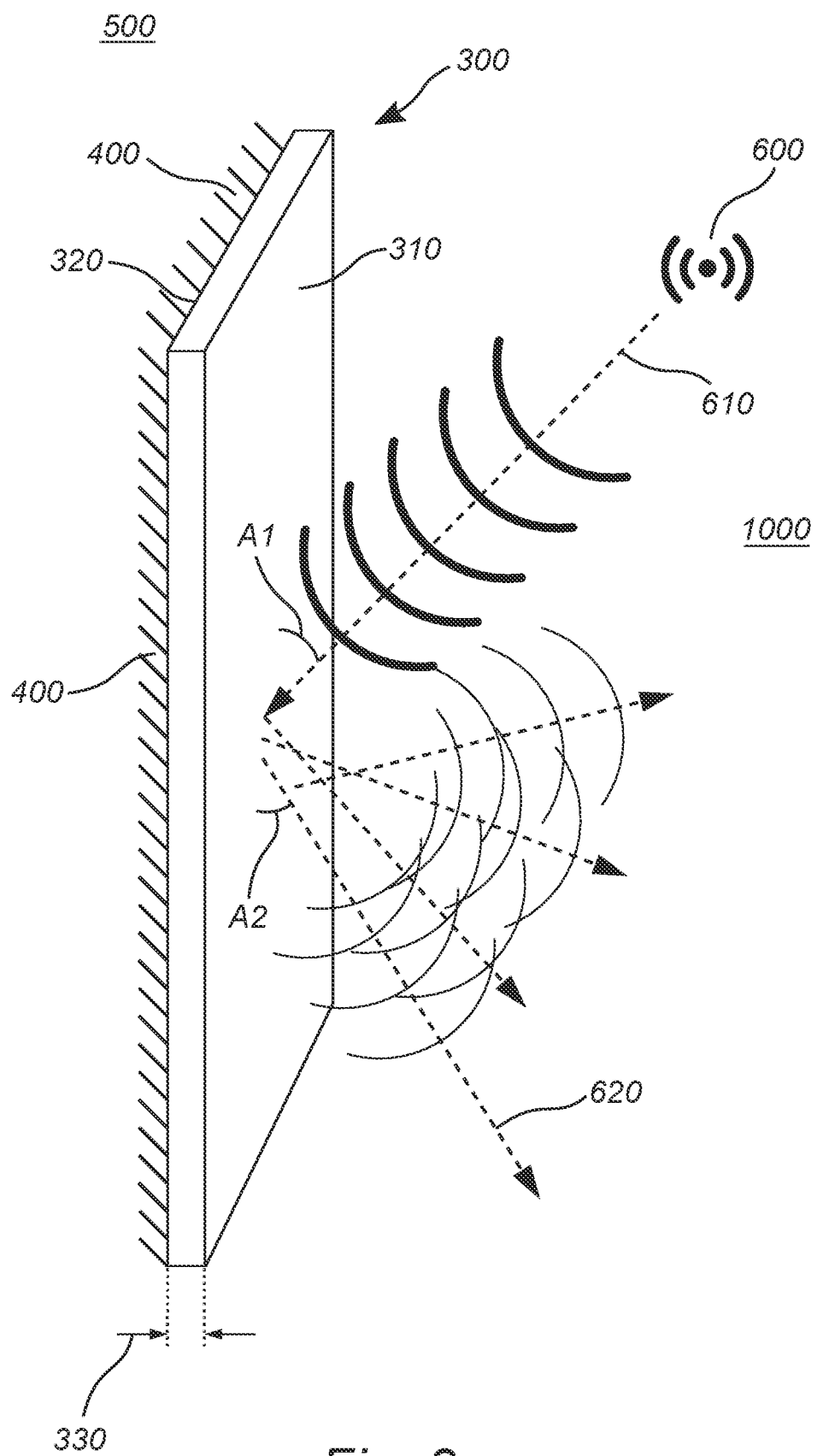
FIG. 2 schematically shows a reflection of a soundwave against a virtual object.

The selected virtual object 300 may be a sound-absorbing plate 300; see FIG. 2. The sound-absorbing plate 300 comprises a first side 310 and a second side 320. The first side 310 and the second side 320 may span two geometrical planes that are substantially parallel. The first side 310 and the second side 320 preferably has a similar area geometry. The total outer area of the sound-absorbing plate 300 may be dominated by the sum of the areas of the first side 310 and the second side 320. When the sound-absorbing plate 300 is placed at the empty area 400, one of the first side 310 and the second side 320 faces the environment 1000 and the remaining side faces a wall 500, a ceiling 510, a door 550 or the like. In FIG. 2, the empty area 400 is an intersection region 400 between the sound-absorbing plate 300 and a wall 500. The sound-absorbing plate 300 may have any suitable geometry. For instance, the geometry of the first and the second side of the sound-absorbing plate may have any one of a rectangular geometry (as shown in FIG. 2), a quadrangular geometry, a triangular geometry, a circular geometry, and an elliptical geometry. The sound-absorbing plate 300 has a base area, i.e., the area of the first side 310 or the area of the second side 320, and a height 330. The height 330 is the shortest distance between the first and the second side, i.e., the distance along a normal vector of the geometrical plane spanned by the base. The height 330 of the sound-absorbing plate 300 is preferably significantly smaller than the square root of the base area. Thus, the height 330 is a thickness of the sound-absorbing plate 300.

A sound-absorbing plate 300 may be placed on a wall 500, a ceiling 510, a door 550, or the like. A sound-absorbing plate 300 may also be placed on a side of a bookshelf, or any other suitable surface.

Should the empty area 400 be a window 540, the selected virtual object 300 may be a curtain, a blind, or the like. Alternatively, the selected virtual object 300 may be a piece of furniture, e.g., a couch or an armchair. Other examples of selected virtual objects are a pillow, a table cloth or a blanket.

The method 100 comprises rendering 40 an updated soundscape in the environment 1000 using the present soundscape and sound-absorbing properties of the selected virtual object 300. The updated soundscape may be rendered in real time. Alternatively, the updated soundscape may be rendered by recording and storing the present soundscape and thereafter rendered at a later time. After such a storing, the updated soundscape may be rendered by adjusting the stored present soundscape based on sound-absorbing properties of the selected virtual object 300.

The sound-absorbing properties may comprise the product of the level of sound-absorption per unit area of the virtual object 300 and the area of the virtual object 300. The level of sound-absorption per unit area of the virtual object 300 may be determined empirically or modelled theoretically using any adequate model. The rendered updated soundscape further depends on the incident angle A1 of the incoming sound 610 and the reflective angle A2 of the reflected sound 620 on the virtual object 300. Such a reflection is, highly schematically, shown in FIG. 2 and FIGS. 4A and 4B. The rendered updated soundscape further depends on the location of respective microphone of the array of microphones 210 being used while recording the present soundscape. Should the virtual object 300 be a sound-absorbing plate 300, the area of the virtual object 300 is, at least to a sufficient accuracy, the area of one of the first side 310 or the second side 320 facing the environment 1000, as the thickness 330 of the sound-absorbing plate 300 may be relatively small.

As discussed above, the recording 10 of the present soundscape may identify, using, e.g., the 3D sound localization algorithm, incoming angles A1 of the sound present in the environment 1000, allowing calculation of an origin of respective part of the sound. The origin of respective part of the sound may refer to both the actual source of sound 600, as well as a location in the environment where the sound reflects/reverbs to finally being recorded and/or perceived by the user 1.

Using this knowledge of the soundscape, the soundscape may be updated by, e.g., dampening sound in the present soundscape originating from the position of the virtual object 300, wherein the dampening may be determined using the sound-absorbing properties of the virtual object 300. A virtual object 300 having highly sound-absorbing properties means more sound dampening compared to a virtual object 300 having less sound-absorbing properties. The sound-absorbing properties of the virtual object 300 may depend the material of the virtual object 300, the size of the virtual object 300, or the like. A relatively large-sized virtual object 300 may dampen incoming sound 610 from a relatively large range of incoming angles 610 of sound compared to a smaller-sized virtual object 300. For example, in the case of a sound-absorbing plate 300, the sound-absorption per unit area of the sound-absorbing plate 300 and the area of the sound-absorbing plate 300 determines which part, and how much, of the soundscape that should be dampened.

Dampening may be achieved by any suitable filtering of the defined parts (e.g., having the relevant angles of arrival to the microphones) of the soundscape of the room. Generally, sound in an environment comprises three components, namely direct sound, early reflections and reverbing sound. In one embodiment, depending on the sound-absorbing properties of the virtual object 300, and the type of sound 620 (e.g. the components described above) that arrives to the listener 1 (microphones) from the angle(s) A2 of the virtual object 300, different filters may be applied to achieve the simulation of the dampening effect that would occur if the virtual object 300 was a real object. In other embodiments, one or more from the list of a low pass filter, a high pass filter, a bandpass filter, a bandstop filter, a comb filter, a peaking filter or a shelving filter may be applied to the incoming sound 620 from the identified angles (where the virtual object 300 is placed) in the environment 1000.

For example, ambient muting in combination with beamforming algorithms to only mute ambient sound in the soundscape of the environment 1000 from a specific range of angles (based on the added virtual object 300) may be used to achieve a desired functionality.

Still with reference to FIG. 1, the method 100 comprises playing 50 the rendered updated soundscape to a user. The user may then evaluate the soundscape of the environment 1000 including the virtual object 300. The soundscape may be played to the user with a speaker 240 configured to play the updated soundscape. Any kind of such a speaker 240 is possible. For instance, the speaker 240 may be included in a set of headphones 700. Such a set of headphones 700 may for instance be earbuds, earphones or over-ear headphones. Thus, headphones 700 may comprise both the array of microphones 210 for recording sound in the environment and a speaker 240 for playing the rendered updated soundscape.

The method 100 comprises displaying 60 the selected virtual object 300 placed at the empty area 400 to the user. The user may subsequently evaluate the method regarding the classification of the empty area 400, the size of the virtual object 300 to be placed in the empty area, and the like. For displaying 60, any kind of display 250 may be used. Such a display 250 may include any one of a smartphone 800 screen, a tablet screen, smart glasses, stereovision glasses, a computer, or the like. The displaying 60 may comprise displaying the environment 1000 including the virtual object 300. A portion of the environment 1000, e.g., a wall 500 in a room, including the virtual object 300 may be displayed to the user 1. The user 1 may, e.g., in a displayed augmented reality, AR, manually move the virtual object 300 to any suitable location in the environment 1000. A further updated soundscape may sequentially be played to the user 1, accounting for the manual movement of the virtual object 300. Should the method 100 present an incorrect classification of the empty area 400, the user 1 may provide feedback for preventing such an incorrect classification in future similar classifications. For instance, if the method 100 classifies the empty area 400 being a portion of a floor 520, the method may select a carpet 530 to be the virtual object 300. If, however, the actual empty area is a wall 500 in such a situation, the method 100 may incorrectly place the carpet 530 on the wall 500. The user 1 may thus provide adequate feedback for subsequently preventing the method 100 to perform such an inaccurate classification.

Both the played updated soundscape of the environment 1000 and the displayed environment 1000 may be experienced by the user 1 in real time. Alternatively, the played updated soundscape of the environment 1000 and the displayed environment 1000 may be sequentially be experienced by the user 1. For instance, the updated soundscape may be played to the user 1 during a period of time and afterwards being turned off. After being turned off, the displayed environment 1000 may be shown to the user 1. Another option is any time delay between the played updated soundscape and the displayed environment 1000.

The environment 1000 may be displayed on the display 250 continuously while continuously changing location and/or direction of the camera 220. The updated soundscape may be played to the user during such a movement of the camera 220. Alternatively, a video from such a movement may be recorded, and the updated soundscape may be stored. In such a situation, the video and the stored updated soundscape may be, after any possible postprocessing, overlaid to subsequently be experienced by the user.

Figure 3:
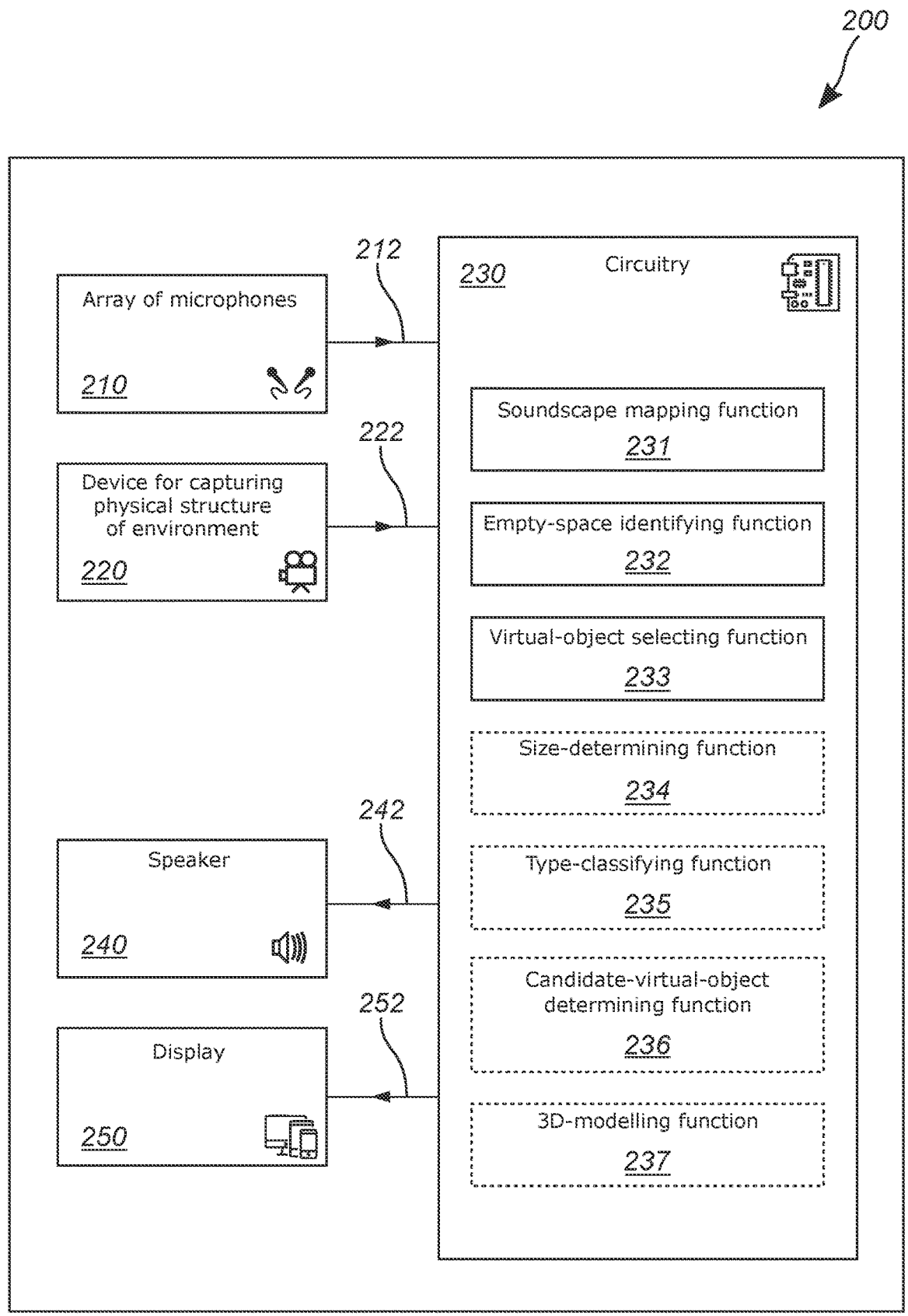
FIG. 3 schematically shows an electronic device on which the method may be implemented.

In connection with FIG. 3 an electronic device 200 on which the disclosed method 100 is implemented.

The electronic device 200 comprises an array of microphones 210 configured to record a present soundscape of the environment 1000. The array of microphones 210 may be freestanding such that being configured to wirelessly communicate 212 with circuitry 230 of the electronic device, e.g., by Bluetooth, Wi-Fi, or the like. The circuitry 230 of the electronic device 200 will be further described below. The array of microphones 210 may also communicate 212 with the circuitry 230 by wire. For instance, the array of microphones 210 may be built into a set of wireless or wired headphones for recording the present soundscape. The set of wireless or wired headphones may be earphones, earbuds, over-ear headphones, or the like. Should the array of microphones 210 be built into a set of earphones, each earphone may comprise a plurality of microphones. The array of microphones 210 may be physically built into the electronic device 200.

The electronic device 200 comprises a device 220 configured to capture a digital representation of a physical structure of the environment 1000. The physical structure of the environment 1000 may refer to information that can be visually perceived by the user 1. Thus, the physical structure of the environment 1000 may refer to information that can be captured by a camera, a 3D scanner, or the like. The device 220 configured to capture a digital representation of a physical structure of the environment 1000 may be a camera or a 3D scanner. In case of the device 220 being a camera, the camera may be configured to capture one or more images of the environment 1000. The device 220 may be freestanding such that being configured to wirelessly communicate 222 with the circuitry 230 by, e.g., Bluetooth, Wi-Fi, or the like. The device 220 may alternatively wiredly communicate 222 with the circuitry 230. The device 220 may be a built-in camera of a smartphone 800, a tablet, a computer, or the like. The device 220 may an ordinary digital camera. The device 220 may be a 360-degree camera. The device 220 may a 3D scanner, based on a 3D-scanning technology. Such a 3D scanner may be built into a smartphone 800. Examples of such 3D-scanner technologies are time-of-flight lasers, light detection and ranging (LIDAR) lasers, conoscopic-holography based methods, phase-shift based methods, triangulation-based methods, or the like. The device 220 may be any combination of an ordinary digital camera, a 360-degree camera and a 3D scanner. For instance, a digital camera of a smartphone 800 may be supplemented by a 3D scanner.

The electronic device 200 comprises circuitry 230.

The circuitry 230 is configured to carry out overall control of functions and operations of the electronic device 200. The circuitry 230 may include a processor, such as a central processing unit (CPU), microcontroller, or microprocessor. The processor is configured to execute program code stored in the circuitry 230 to carry out functions and operations of the electronic device 200.

Executable functions, further described below, may be stored on a memory. The memory may be one or more of a buffer, a flash memory, a hard drive, a removable media, a volatile memory, a non-volatile memory, a random access memory (RAM), or other suitable devices. In a typical arrangement, the memory may include a non-volatile memory for long term data storage and a volatile memory that functions as system memory for the circuitry 230. The memory may exchange data with the circuitry 230 over a data bus. Accompanying control lines and an address bus between the memory and the circuitry 230 may be present.

Functions and operations of the circuitry 230 may be embodied in the form of executable logic routines, e.g., computer-code portions, software programs, etc., that are stored on a non-transitory computer readable medium, e.g., the memory, of the electronic device 200 and are executed by the circuitry 230 by, e.g., using the processor. The functions and operations of the electronic device 200 may be a stand-alone software application or form a part of a software application that carries out additional tasks related to the electronic device 200. The described functions and operations may be considering a method that the corresponding device is configured to carry out. Also, while the described functions and operations may be implemented in a software, such functionality may as well be carried out via dedicated hardware or firmware, or some combination of hardware, firmware and/or software.

The circuitry 230 is configured to execute a soundscape recording function 231. The soundscape recoding function 231 is configured to record a present soundscape of the environment 1000 by analyzing sound recorded by the array of microphones 210. The soundscape recording function 231 is further configured to render an updated soundscape in the environment 1000 using the present soundscape and sound-absorbing properties of the selected virtual object 300.

Below is a short description of a set of functions to be executed by the circuitry 230. Additional details of respective function may be disclosed in connection with FIG. 1 above.

The circuitry 230 is configured to execute an empty-area identifying function 232. The empty-area identifying function 232 is configured to identify an empty area 400 in the environment 1000 from the one or more images of the environment 1000. The empty-area identifying function 232 may be configured to identify the empty area 400 in the environment 1000 by applying an object segmentation algorithm on an image of the environment 1000.

The circuitry 230 is configured to execute a virtual-object selecting function 233. The virtual-object selecting function 233 is configured to select a virtual object 300 to be placed at the empty area 400 in the environment.

The circuitry 230 may be configured to execute a size-determining function 234. The size-determining function 234 is configured to determine a size of the empty area 400, wherein the virtual-object selecting function 233 is configured to select the virtual object 300 based on the size of the empty area 400. The size-determining function 234 may be configured to determine the size of the empty area 400 by detected movements of the camera while capturing an image of the environment 1000 including the empty area 400. Such detected movements may, e.g., be registered by an accelerometer. The size-determining function 234 may be configured to determine the size of the empty area 400 by received coordinates, wherein the coordinates may be captured by a 3D scanner. Other ways of determining the size of the empty area 400 comprise defining a 3D coordinate space of the environment 1000 from the image, by applying an algorithm to the image. By way of example, the 3D coordinate space may be calculated by applying a Plane detection algorithm, or a RANSAC algorithm, or a Hough algorithm, or the like, to the image. From the 3D coordinate space, positions and sizes of defined objects in the environment 1000 may be determined, and from that, a size of the empty area 400 may be calculated.

The circuitry 230 may be configured to execute a type-classifying function 235. The type-classifying function 235 is configured to classify a type of the empty area 400. The type of the empty area 400 may comprise one or more of a wall 500, a ceiling 510, a floor 520, a window 540, and a door 550.

The circuitry 230 may be configured to execute a candidate-virtual-object determining function 236. The candidate-virtual-object determining function 236 is configured to determine a list of candidate virtual objects based on the type of the empty area 400. The candidate-virtual-object determining function 236 is configured to select one of the candidate virtual objects in the list as the virtual object 300 to be placed at the empty area 400.

The circuitry 230 may be configured to execute a 3D-modelling function 237. The 3D-modelling function 237 is configured to generate a 3D-model of the environment 1000, wherein the empty-area identifying function 232 is configured to identify the empty area 400 in the environment 1000 by applying an object segmentation algorithm on the 3D-model of the environment 1000.

The size-determining function 234, the type-classifying function 235, the candidate-virtual-object determining function 236, and the 3D-modelling function 237 are optional, and visualized by dashed boxes in FIG. 3.

The circuitry 230 may be built into a smartphone 800, a tablet, a computer, or the like.

The electronic device 200 comprises a speaker 240 configured to play the updated soundscape. The speaker 240 may be built into the electronic device 200. For instance, the speaker 240 may be a built-in speaker of a smartphone 800, a tablet, a computer, or the like. The speaker 240 may be a speaker of a set of headphones 700. Examples of headphones 700 are earphones, earbuds, over-ear headphones, or the like. Thus, at least for earphones or earbuds, there are at least one built-in speaker for each earphone/earbud. A speaker-circuitry communication 242 may be similar to the above-mentioned array-of-microphones-circuitry communication 212, i.e., wired or wireless.

The electronic device 200 comprises a display 250 configured to display the selected virtual object 300 placed at the empty area 400. The display 250 may be built into the electronic device 200. For instance, the display 250 may be a built-in display of a smartphone 800, a tablet, a computer, or the like. A display-circuitry communication 252 may be similar to the above-mentioned communication 222 between the camera/3D-scanner and the circuitry 230.

The electronic device 200 may be implemented in an augmented reality, AR, or virtual reality, VR, device. AR is an interactive experience of a real-world environment where the objects that reside in the real world may be enhanced by computer-generated perceptual information. AR may be defined as a system that fulfills the features: a combination of real and virtual worlds, real-time interaction, and accurate 3D registration of virtual and real objects. VR is a simulated experience that may be similar to or completely different from the real world. Applications of VR may include entertainment, such as video games, and educational purposes.

An AR or VR device may include the above-mentioned equipment, i.e., an array of microphones 210, a camera/3D scanner 220, a speaker 240, a display 250, and circuitry 230 for execution of the functions 231-237 described above. An AR or VR device may further include a curved screen to improve realism of the environment 1000 including the virtual object 300. Other examples of electronic devices 200 utilized for implementing the disclosed method can be mixed reality-, MR, cinematic reality-, CR, or cross reality, XR, devices.

Figure 4B:
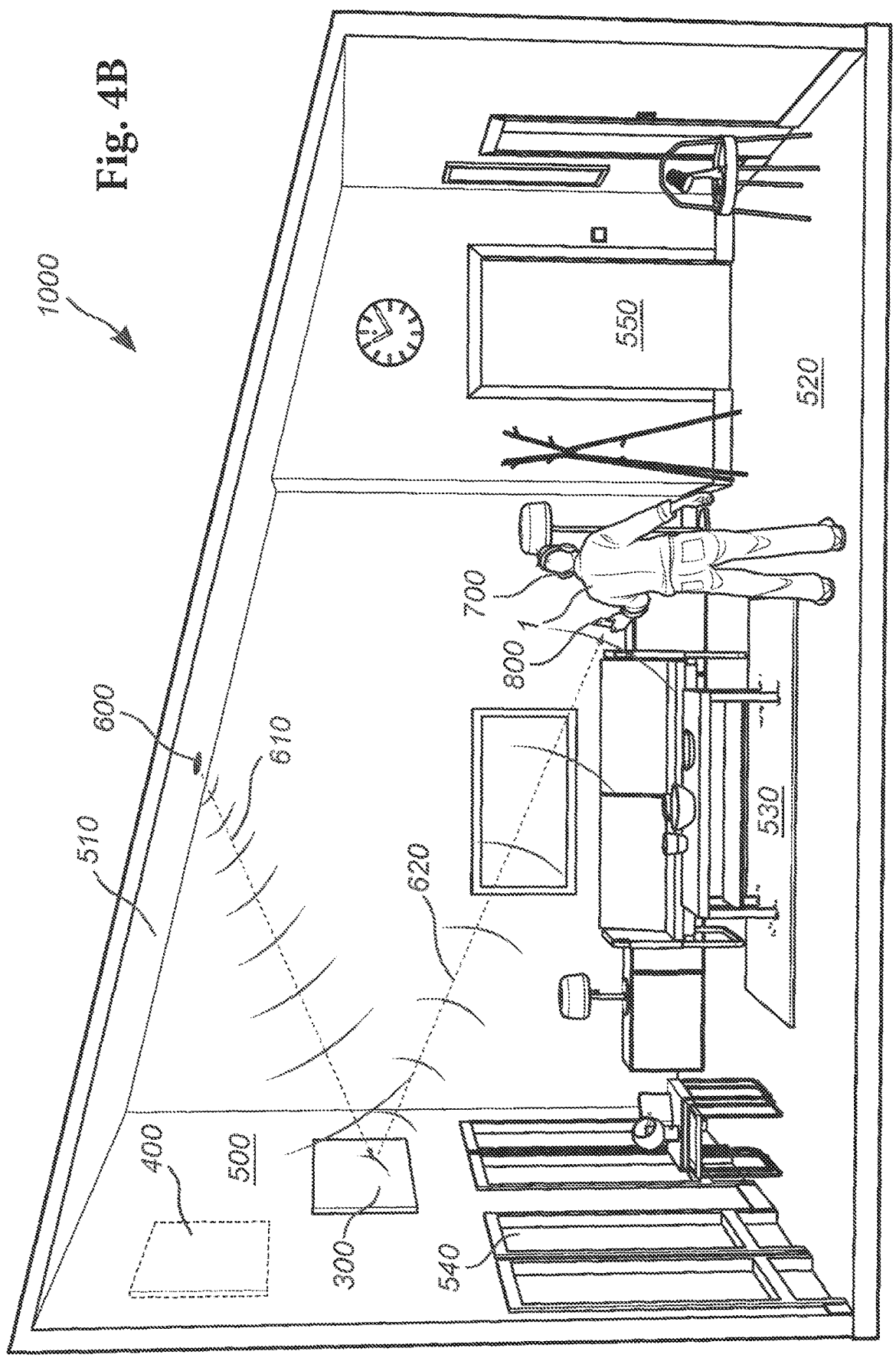

FIGS. 4A and 4B show the environment 1000 on which the electronic device 200 comprising the implemented method 100 may be applied. FIG. 4A shows the environment 1000 without a virtual object 300 and FIG. 4B shows the environment 1000 with a virtual object 300. The environment 1000 is here displayed being a living room of a home. However, the method 100 may be implemented in other types of environments. A source of sound 600 to be damped by a virtual object 300 is schematically shown. The virtual object 300 is placed on an empty area 400, the empty area 400 being determined according to the above-mentioned description. Here, a separate empty area 400 is shown for illustrative purposes. The skilled person realizes that there are many other empty areas in the environment 1000 of FIGS. 4A and 4B for placing virtual objects onto. The virtual object 300 is excluded from the physical structure of the environment 1000 as displayed in FIGS. 4A and 4B. The virtual object 300 may be displayed to a user 1 on a display 250 on the electronic device 200 comprising the implemented method 100. The display 250 may be a display of a smartphone 800, or the like. The soundscape of the environment 1000 including the virtual object 300 may be played to the user 1 by a speaker 240. The speaker 240 may be a speaker of a set of headphones 800. Thus, the user 1 may experience a soundscape in the environment 1000 including the virtual object 300. Further details of FIGS. 4A and 4B are incorporated in the above-mentioned text.

The person skilled in the art realizes that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims.

The invention claimed is:

1. A method for rendering a soundscape in an environment of a real-world indoor scene, said method comprising:
    capturing, using a camera, a digital representation of a physical structure of the environment,
    recording, using one or more microphones, a present soundscape in the environment,
    identifying, using processing circuitry, an empty area in the environment from the digital representation of the physical structure of the environment,
    selecting, using the processing circuitry, a virtual object to be placed at the empty area in the environment, rendering, using the processing circuitry, an updated soundscape in the environment using the present soundscape and sound-absorbing properties of the selected virtual object, playing, using a speaker, the rendered updated soundscape, and displaying, using a display, the selected virtual object placed at the empty area.

2. The method of claim 1, further comprising:
determining a size of the empty area, wherein selecting the virtual object is based on the size of the empty area.

3. The method of claim 1, further comprising:
classifying a type of the empty area, wherein the type of the empty area comprises one or more of a floor, a wall, a ceiling, a window, and a door, determining a list of candidate virtual objects based on the type of the empty area, wherein the selecting a virtual object to be placed at the empty area is performed by selecting one of the candidate virtual objects in the list as the virtual object to be placed at the empty area.

4. The method of claim 1, wherein the updated soundscape is rendered in real time; or wherein the updated soundscape is rendered by (1) recording and storing the present soundscape and (2) thereafter rendering the updated soundscape by adjusting the stored present soundscape based on sound-absorbing properties of the selected virtual object.

5. The method of claim 1, wherein the sound-absorbing properties comprise a product of a level of sound-absorption per unit area of the virtual object and the area of the virtual object.

6. The method of claim 1, wherein the recording of the present soundscape comprises:
recording sound in the environment using an array of microphones, and
applying a 3D sound localization algorithm on the recorded sound.

7. The method of claim 1, wherein the identifying of the empty area in the environment comprises applying an object segmentation algorithm on an image of the environment.

8. The method of claim 1, further comprising generating a 3D-model of the environment, wherein the identifying of the empty area in the environment comprises applying an object segmentation algorithm on the 3D-model of the environment.

9. A non-transitory computer-readable storage medium having stored thereon program code portions for implementing the method according to claim 1 when executed on a device having processing capabilities.

10. An electronic device comprising:
an array of microphones configured to record a present soundscape of an environment of a real-world indoor scene,
a device configured to capture a digital representation of a physical structure of the environment,
circuitry configured to execute:
a soundscape recording function configured to record a present soundscape of the environment by analyzing sound recorded by the array of microphones,
an empty-area identifying function configured to identify an empty area in the environment from the digital representation of the physical structure of the environment,
a virtual-object selecting function configured to select a virtual object to be placed at the empty area in the environment, wherein the soundscape recording function is further configured to render an updated soundscape in the environment using the present soundscape and sound-absorbing properties of the selected virtual object, the electronic device further comprises:
a speaker configured to play the updated soundscape,
a display configured to display the selected virtual object placed at the empty area.

11. The electronic device of claim 10, wherein the circuitry is further configured to execute:
a size-determining function configured to determine a size of the empty area, wherein the virtual-object selecting function is configured to select the virtual object based on the size of the empty area.

12. The electronic device of claim 10, wherein the circuitry is further configured to execute:
a type-classifying function configured to classify a type of the empty area, wherein the type of the empty area comprises one or more of a floor, a wall, a ceiling, a window, and a door,
a candidate-virtual-object determining function configured to determine a list of candidate virtual objects based on the type of the empty area,
wherein the virtual-object selecting function is configured to select one of the candidate virtual objects in the list as the virtual object to be placed at the empty area.

13. The electronic device of claim 10, wherein the empty-area identifying function is configured to identify the empty area in the environment by applying an object segmentation algorithm on the digital representation of the physical structure of the environment.

14. The electronic device of claim 10, wherein the circuitry is further configured to execute a 3D-modeling function configured to generate a 3D-model of the environment, wherein the empty-area identifying function is configured to identify the empty area in the environment by applying an object segmentation algorithm on the 3D-model of the environment.

15. The electronic device of claim 10, implemented in an augmented reality, AR, device or a virtual reality, VR, device.

16. The electronic device of claim 10, wherein the selected virtual object is a sound-absorbing plate.

17. The electronic device of claim 10, wherein the empty area is a substantially flat surface and reflects soundwaves towards a user in the environment without being substantially attenuated or damped by an object in the environment.

18. The electronic device of claim 10, further comprising a motion sensor, wherein the device configured to capture the digital representation of the physical structure of the environment comprises a camera, and wherein the circuitry is further configured to execute:
a size-determining function configured to determine a size of the empty area based on images of the physical structure of the environment captured by the camera and a motion of the camera obtained from a motion sensor while capturing the images, and wherein the virtual-object selecting function is configured to select the virtual object based on the size of the empty area.

19. The electronic device of claim 10, wherein the virtual object corresponds to a real object to be placed at the empty area in the environment.

20. An electronic device comprising:
a display;
a speaker;
a microphone;
a camera; and circuitry coupled to the display, the speaker, the camera and the microphone, wherein the circuitry is configured to:
- determine a present soundscape of an environment of a real-world indoor scene by analyzing sound recorded by the microphone positioned in the environment;
- identify an empty area in the environment from a digital representation of the environment captured by the camera, wherein identifying the empty area includes identifying a size of the empty area and a type of the empty area;
- identify a plurality of candidate virtual objects based on the size of the empty area or the type of the empty area;
- receive a selection of a virtual object from the plurality of candidate virtual objects;
- display, on the display, an augmented reality image or virtual reality image including the selected virtual object placed at the empty area;
- render an updated soundscape in the environment by adjusting the present soundscape based on sound-absorbing properties of the selected virtual object; and
- output, using the speaker, a sound corresponding to the updated soundscape.

21. The electronic device of claim 20, wherein the circuitry is configured to:
- change a size of the virtual object; and
- in response to the change in the size of the virtual object, further adjust the updated soundscape based on the sound-absorbing properties of the virtual object and the changed size of the virtual object.

22. The electronic device of claim 20, wherein the empty area is a substantially flat surface and reflects soundwaves towards a user in the environment without being substantially attenuated or damped by an object in the environment.

* * * * *